(12) United States Patent
Hasui

(10) Patent No.: US 7,484,086 B2
(45) Date of Patent: Jan. 27, 2009

(54) DATA PROCESSING APPARATUS, AND METHOD OF RECONFIGURING RECONFIGURABLE PROCESSING CIRCUIT

(75) Inventor: Shigeki Hasui, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 11/370,658

(22) Filed: Mar. 7, 2006

(65) Prior Publication Data

US 2006/0212255 A1    Sep. 21, 2006

(30) Foreign Application Priority Data

Mar. 7, 2005    (JP)    .............................. 2005-063154

(51) Int. Cl.
*G06F 9/00*    (2006.01)
*G06F 15/177*    (2006.01)

(52) U.S. Cl. ........................ 713/100; 713/300; 713/320; 713/324; 710/8; 710/10; 710/104; 712/15

(58) Field of Classification Search .................. 713/100
See application file for complete search history.

(56) References Cited

U.S. PATENT DOCUMENTS

| 6,701,273 | B2 * | 3/2004 | Nishigaki et al. ............ 702/132 |
| 6,907,524 | B1 * | 6/2005 | Huntington et al. ......... 713/164 |
| 7,107,362 | B2 * | 9/2006 | Wheless et al. ............... 710/10 |
| 2003/0023398 | A1 * | 1/2003 | Lantz et al. .................. 702/130 |
| 2006/0174146 | A1 * | 8/2006 | Prosperi et al. ............. 713/320 |

FOREIGN PATENT DOCUMENTS

JP    2004-22724    1/2004

* cited by examiner

*Primary Examiner*—Thomas Lee
*Assistant Examiner*—Michael J Brown
(74) *Attorney, Agent, or Firm*—Morgan & Finnegan, LLP

(57) ABSTRACT

Information relating to heat-release value of a processing circuit or amount of input data applied to the processing circuit is detected and the processing circuit is reconfigured in accordance with result of detection.

12 Claims, 7 Drawing Sheets

FIG. 3

| Plane | ConfigData1(basis) | | ConfigData2 | | ConfigData3 | | ConfigData4 | |
|---|---|---|---|---|---|---|---|---|
| | Function | Temp Mem | Function | Temp Mem | Function | Temp Mem | Function | Temp Mem |
| A | 1 | A | 2 | B | 3 | C | 4 | D |
| B | 2 | B | 1 | A | 2 | B | 2 | B |
| C | 3 | C | 3 | C | 1 | A | 3 | C |
| D | 4 | D | 4 | D | 4 | D | 1 | A |

DATA PROCESSING APPARATUS, AND METHOD OF RECONFIGURING RECONFIGURABLE PROCESSING CIRCUIT

FIELD OF THE INVENTION

This invention relates to a data processing circuit and to a method of reconfiguring a reconfigurable processing circuit.

BACKGROUND OF THE INVENTION

Rapid progress in the field of micromachining has been accompanied by marked improvement in the performance of reconfigurable logic circuits such as an FPGA (Field Programmable Gate Array) and CPLD (Complex Programmable Logic Device). Further, a reconfigurable processor, which makes it possible to reconfigure a logic circuit during system operation, has been put into practice in recent years.

A reconfigurable processor has a plurality of circuit configuration planes and is characterized in that it can be reconfigured in a time (one to several clocks) much shorter than that an FPGA or CPLD.

The circuit packing density per unit is rapidly increasing in these reconfigurable processors. In addition, the processing functions demanded also are increasing. As a result, there has been a great increase in area and in operating frequency and power consumption is continuing to rise.

Further, the specification of Japanese Patent Application Laid-Open No. 2004-022724 describes that in a case where the temperature of an FPGA detected by a temperature sensor exceeds an allowable temperature, an operating frequency lower than the present operating frequency is set and the FPGA is reconfigured in accordance with the operating frequency set.

An increase in power consumption brings about an increase in heat-release value at the time of operation. This has a major influence upon the operating characteristics of the transistors that construct the reconfigurable processor and is a cause of unstable circuit operation and malfunction.

In general, a method of cooling an LSI package by providing the exterior of the package with a cooling fan is used as means for dealing with the heat evolved by an LSI circuit. A method employed recently employs a water cooling technique in which heat is removed from the LSI package by causing a cooling liquid circulated as by a pump to come into contact with the outer side of the LSI package.

However, these external cooling methods are disadvantageous in terms of operating noise, cost, power consumed by the cooling equipment, area required for installation and degree of design freedom.

Further, a method of lowering circuit operating frequency to suppress power consumption per unit time and prevent a rise in temperature also is available as a heating countermeasure other than cooling by external equipment. In this case, however, it goes without saying that operating speed is sacrificed.

SUMMARY OF THE INVENTION

The present invention has been devised in view of the problems set forth above.

An object of the present invention is to reduce a rise in the temperature of a reconfigurable processing circuit without using external cooling equipment.

Another object of the present invention is to reduce a rise in the temperature of a reconfigurable processing circuit without lowering operating frequency.

A further object of the present invention is to prevent a rise in temperature by changing circuit configuration in accordance with the temperature or data processing state of a configuration plane of a reconfigurable logic circuit, and averaging local temperature over the entirety of the package.

According to the present invention, the foregoing objects are attained by providing a data processing apparatus capable of reconfiguring a processing circuit, comprising detecting means for detecting information relating to a heat-release value of the processing circuit; and reconfiguring means for reconfiguring the processing circuit in accordance with the information relating to the heat-release value.

Further, according to the present invention, the foregoing objects are attained by providing a data processing apparatus capable of reconfiguring a processing circuit, comprising detecting means for detecting information relating to amount of input data applied to the processing circuit; and reconfiguring means for reconfiguring the processing circuit in accordance with the information relating to the amount of input data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram illustrating an example of the structure of reconfiguration data according to the first embodiment;

DETAILED DESCRIPTION OF THE PREFERRED EMBODIMENTS

Preferred embodiments of the present invention will now be described with reference to the drawings.

First Embodiment

In a first embodiment, a rise in the temperature of a reconfigurable processor is detected by a temperature sensor and the configuration of the processor is changed based upon appropriate reconfiguration information if the detected temperature is higher than an allowable temperature.

Figure 1:
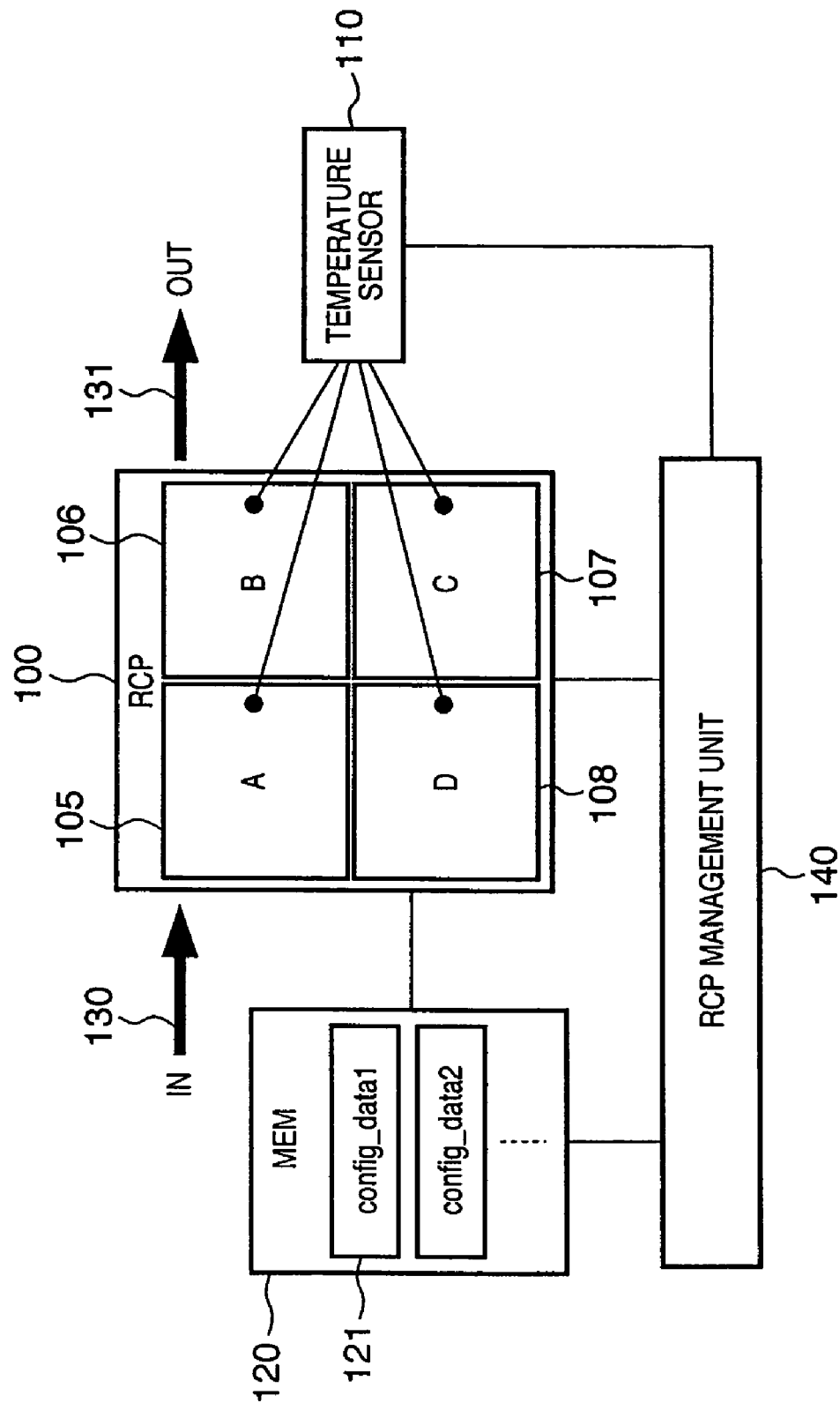
FIG. 1 is a block diagram illustrating an example of the structure of a data processing apparatus according to a first embodiment of the present invention.

FIG. 1 is a block diagram illustrating an example of the structure of a data processing apparatus according to a first embodiment of the present invention. As shown in FIG. 1, the data processing apparatus comprises a reconfigurable processor (RCP) 100, a temperature sensor 110, a memory 120, an input data bus 130, an output data bus 131 and a reconfigurable-processor management unit 140.

The reconfigurable processor 100 is an LSI chip in which the internal circuitry is capable of being reconfigured dynamically during system operation. The internal configuration of the reconfigurable processor 100 will be described with reference to FIG. 2.

Figure 2:
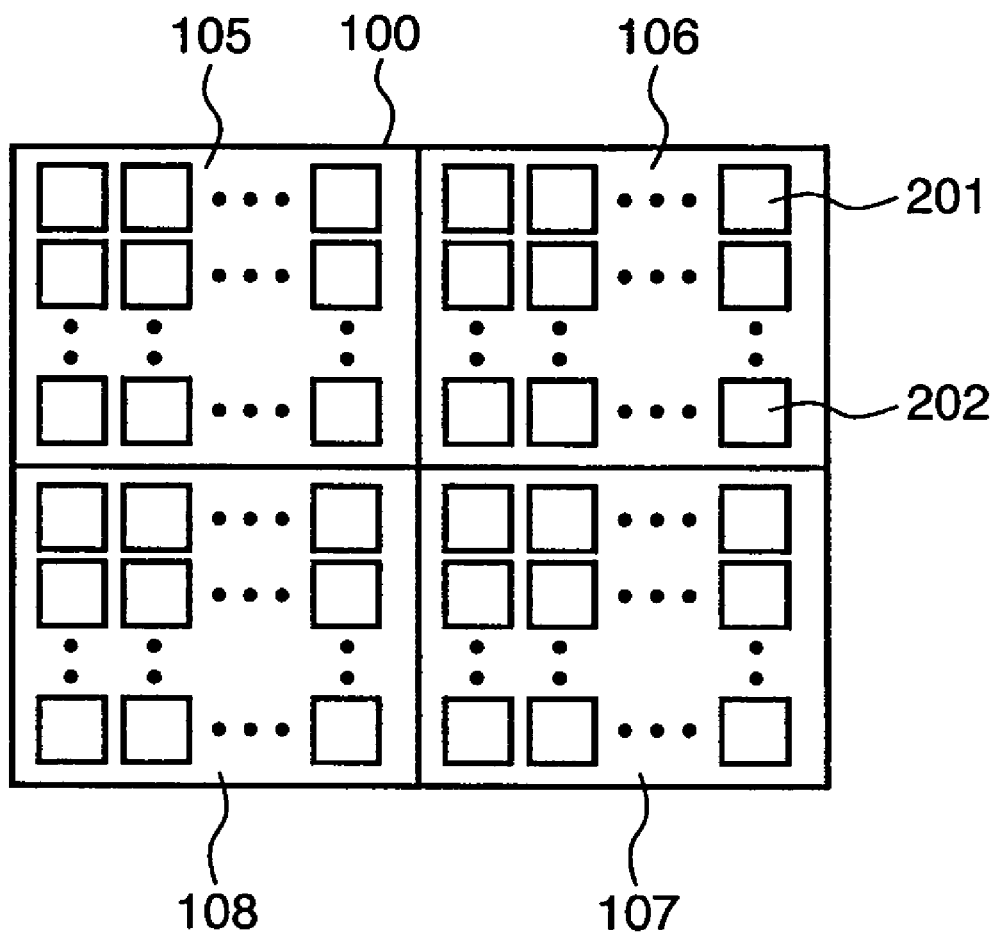
FIG. 2 is a diagram illustrating an example of the configuration of a reconfigurable processor.

FIG. 2 is a diagram illustrating an example of the configuration of the reconfigurable processor 100. As shown in FIG. 2, the reconfigurable processor 100 is such that computing units 201 and memories 202 are connected in a two-dimensional array and the combination of processing operations can be set freely by changing the connection relationship of these elements. Further, the two-dimensional array of computing units 201 and memories 202 is grouped according to a plurality of planes. That is, it is assumed that the reconfigurable processor 100 is composed of four planes, namely a plane (A) 105, plane (B) 106, plane (C) 107 and plane (D) 108, and that it is possible to configure a logic circuit that implements a different operation that differs for every plane.

In FIG. 1, a plurality of input/output terminals (not shown) are disposed for data input/output peripheral to the reconfigurable processor 100. The reconfigurable processor 100 loads the data that enters from the input data bus 130, executes processing based upon the operating frequency that enters from an external PLL circuit (not shown) and thenceforth outputs the result of processing from the output data bus 131 to the exterior of the processor.

The temperature sensor 110 measures the temperature of the reconfigurable processor 100. The temperature sensor 110 measures the heat-release value of the reconfigurable processor 100 and detects it as temperature information, which is proportionally related. In the first embodiment, temperature information detected independently for each of the four operating planes is output to the reconfigurable-processor management unit 140.

The memory 120 is a storage element constituted by a semiconductor memory. The interior of the memory 120 possesses a plurality of items of configuration data 121 serving as configuration information of the logic circuit of the reconfigurable processor 100.

The configuration data 121 has function information for each of the planes, which are implemented by the plane (A) 105, plane (B) 106, plane (C) 107 and plane (D) 108, and circuit-configuration position information. For example, the information is composed of information that configures functions A, B, C and D, which are not shown, on plane (A) 105, plane (B) 106, plane (C) 107 and plane (D) 108, respectively.

The above-described function information for each of the planes held in the memory 120 as the configuration data 121 is the same. However, it is assumed that the memory 120 holds a plurality of different items of circuit-configuration position information.

FIG. 3 is a circuit illustrating an example of the structure of the reconfiguration data 121 according to the first embodiment. As shown in FIG. 3, configuration data 1 is stored in memory 120 as the basic data. Items of configuration data 2, 3 and 4, in which functions 2, 3 and 4, respectively, are interchanged for function 1, are also stored in memory 120.

Configuration data 2 is such that functions 1 and 2 that configure circuit configuration planes A and B, respectively, have been interchanged, configuration data 3 is such that functions 1 and 3 that configure circuit configuration planes A and C, respectively, have been interchanged, and configuration data 4 is such that functions 1 and 2 that configure circuit configuration planes A and B, respectively, have been interchanged.

It should be noted that the items of configuration data 2, 3 and 4 refer to circuit configuration planes, which are indicated by the circuit-configuration position information possessed by the configuration data 1, as temporary memories for operation processing.

More specifically, in the configuration data 2 shown in FIG. 3, plane (A) 105 configures the circuit of function 2. However, the configuration data refers to portions of the memory 202 of plane (B) 106 (the memory before the interchange) and plane (A) 105 as temporary memories for operation processing. Similarly, in the configuration data 3, plane (C) 107 configures the circuit of function 1. However, the configuration data refers to portions of the memory 202 of plane (A) 105 (the memory before the interchange) and plane (C) 107 as temporary memories for operation processing.

The structure of the reconfigurable-processor management unit 140 and processing for circuit reconfiguration will now be described.

Figure 4:
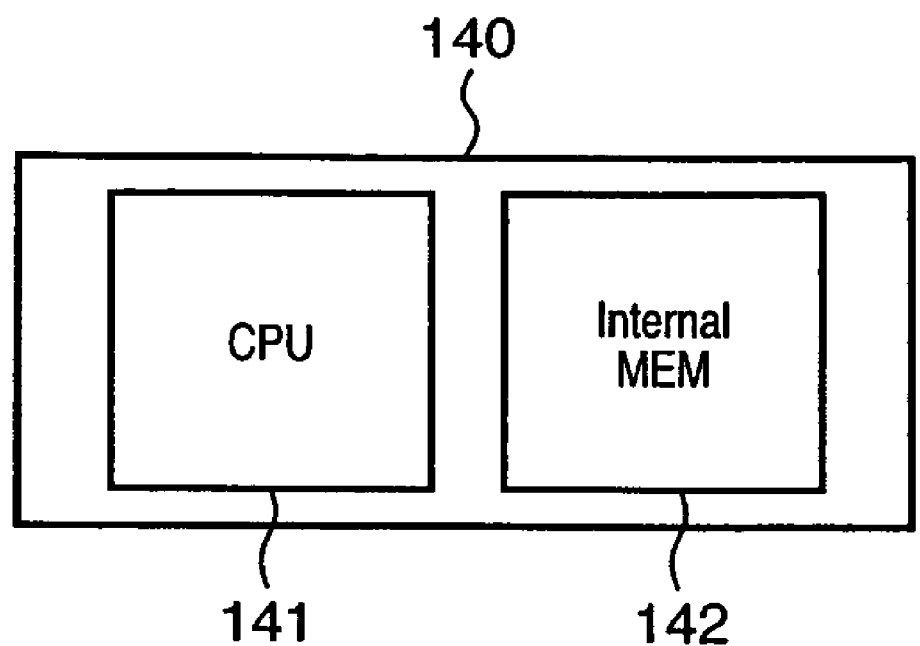
FIG. 4 is a diagram illustrating an example of the structure of a reconfigurable-processor management unit.

FIG. 4 is a diagram illustrating an example of the structure of the reconfigurable-processor management unit 140. As shown in FIG. 4, the reconfigurable-processor management unit 140 comprises a CPU 141 and an internal memory 142.

In the arrangement described above, the reconfigurable-processor management unit 140 reads out the configuration data 121, which has been stored in the memory 120, and executes processing for circuit reconfiguration.

The circuit reconfiguration processing executed by the reconfigurable-processor management unit 140 will be described with reference to FIG. 5.

Figure 5:
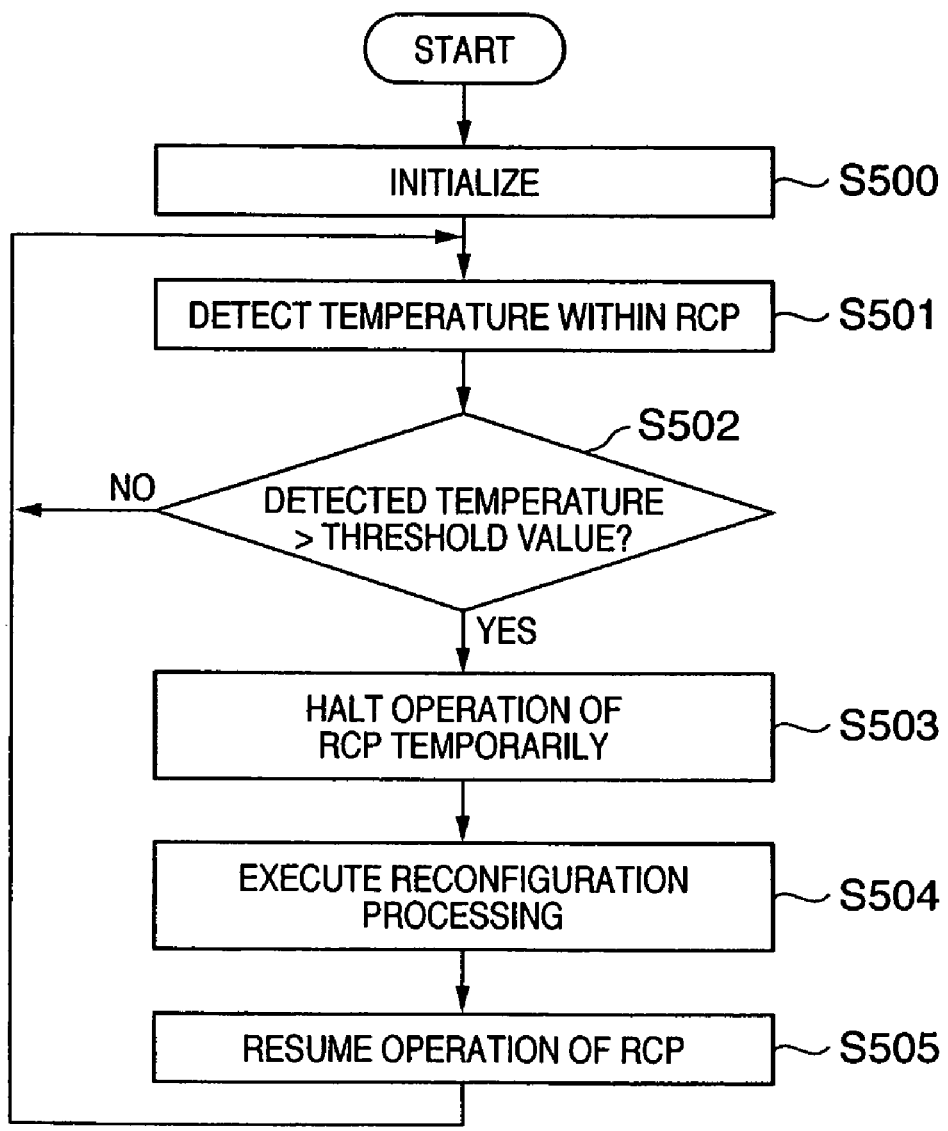
FIG. 5 is a flowchart illustrating circuit reconfiguration processing according to the first embodiment.

FIG. 5 is a flowchart illustrating circuit reconfiguration processing according to the first embodiment.

First, at step S500, the data processing apparatus shown in FIG. 1 is initialized. More specifically, the configuration data 1 is loaded in the reconfigurable processor 100 as the initial circuit configuration and the logic circuit is configured. At this time the functional configuration of each plane is as indicated in the configuration data 1. Functions 1, 2, 3 and 4 are configured in plane (A) 105, plane (B) 106, plane (C) 107 and plane (D) 108, respectively. Further, the temperature sensor 110 and reconfigurable processor 100 are also initialized.

Next, when the initialization at step S500 ends, control proceeds to step S501, where the reconfigurable processor 100 is placed in the operating state. Further, the temperature sensor 110 detects the temperatures of the plane (A) 105, plane (B) 106, plane (C) 107 and plane (D) 108 within the reconfigurable processor 100 and reports the detected temperatures to the reconfigurable-processor management unit 140 at all times.

It is preferred that the timing at which detected temperature is reported be synchronized to the operating frequency of the reconfigurable processor 100.

Further, the CPU 141 detects the temperature of the circuit configuration planes within the reconfigurable processor 100, the temperatures being output from the temperature sensor 110. Next, at step S502, the CPU 141 compares the detected temperature with reference temperature threshold information (not shown), which is for execution of circuit reconfiguration, stored beforehand in the internal memory 142. If the detected temperatures of all of the circuit configuration planes are equal to or less than the above-mentioned temperature threshold information ("NO" at step S502), control returns to step S501 and processing for temperature detection is continued.

If the detected temperature of any circuit configuration plane is found to be higher than the temperature threshold information ("YES" at step S502), control proceeds to step S503 in order to execute the circuit reconfiguration operation. Here the operation of the reconfigurable processor 100 is halted temporarily in preparation for circuit reconfiguration. Since data input becomes impossible at this time, a data-input halt signal (not shown) within the input data bus 130 is asserted to halt the input of data from the circuitry connected upstream.

Next, at step S504, the reconfigurable-processor management unit 140 instructs the memory 12 to read the configuration data 121 out to the reconfigurable processor 100 and executes circuit reconfiguration processing. The configuration data 121 read out is that obtained by selecting data in which the circuit configuration plane has been interchanged with any one circuit configuration plane that does not exceed the temperature threshold.

It is preferred that a configuration plane for which the separation between the detected temperature and temperature threshold is greatest be selected as the one circuit configuration plane that does not exceed the temperature threshold.

More specifically, assume that the detected temperature of the circuit configuration plane (A) 105 exceeds the temperature threshold of plane (A) during execution of processing with the configuration of the configuration data 1 shown in FIG. 3. If in this case the separation between the detected temperatures of the other planes (B, C and D) and the temperature threshold is greatest for the plane (C), then the reconfigurable-processor management unit 140 instructs the memory 120 to read in the configuration data 3 in which the circuit configuration plane (A) 105 and circuit configuration plane (C) 107 have been interchanged. Thus, the circuit configuration is changed in such a manner that a local temperature rise is averaged over the entire package.

Finally, at step S505, the operation of the reconfigurable processor 100 is resumed and control returns to step S501.

In accordance with the first embodiment, as described above, a function that has been configured on a circuit configuration plane that has attained a high temperature is interchanged with a circuit configuration plane for which the temperature is low. In addition, after the circuit reconfiguration is carried out, reference is had to the temporary memory of the preceding plane. As a result, continued operation becomes possible even after execution of circuit reconfiguration. That is, local temperature rise of the circuit is avoided and the temperature load thereof is dispersed over the entire circuit. This makes it possible to suppress the temperature rise of the overall package in which the circuit is sealed.

Accordingly, circuit operation can be continued without lowering the operating frequency of the reconfigurable processor 100 as compared with the prior art.

Second Embodiment

A second embodiment according to the present invention will now be described in detail with reference to the drawings. In the first embodiment, a rise in the temperature of the reconfigurable processor 100 is detected using the temperature sensor 110 and reconfiguration processing is executed if the detected temperature is higher than an allowable temperature. By contrast, the second embodiment detects the bandwidth of the input data bus and executes reconfiguration processing in accordance with the bandwidth detected.

It should be noted that the amount of circuit power consumption, which is proportional to the circuit heat-release value, is proportional to the toggling rate of the signal on the data bus. The second embodiment, therefore, is based upon the fact that if data throughput in a certain circuit is large, then the toggling rate in the circuit is high and so is the heat-release value. Here the toggling of a signal means that the signal switches back and forth between "0" and "1".

Figure 6:
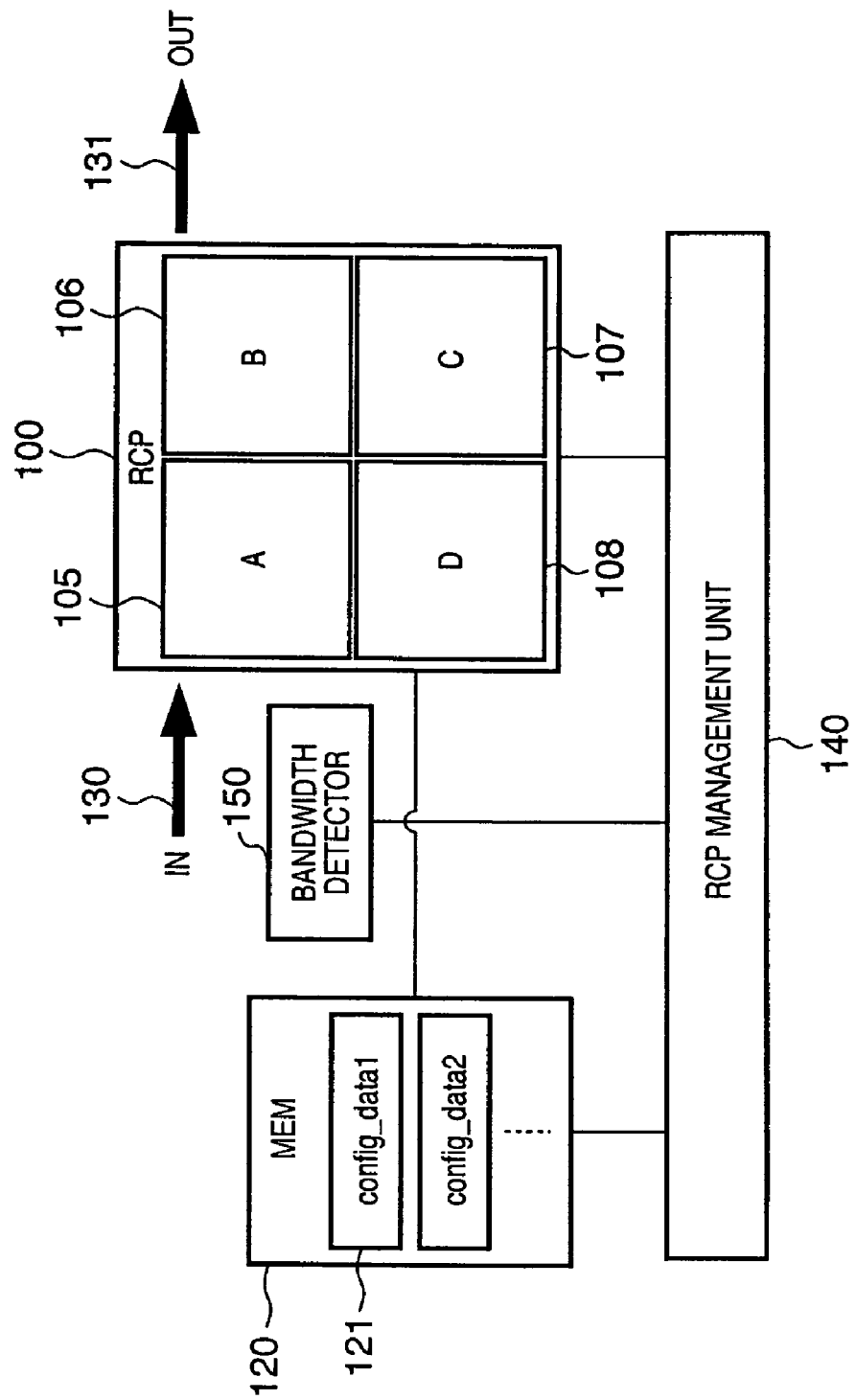
FIG. 6 is a block diagram illustrating an example of the structure of a data processing apparatus according to a second embodiment of the present invention.

FIG. 6 is a block diagram illustrating an example of the structure of a data processing apparatus according to a second embodiment of the present invention. In the second embodiment, as shown in FIG. 6, the temperature sensor 110 is removed from the arrangement of the first embodiment illustrated in FIG. 1 and is replaced by a bandwidth detector 150.

The bandwidth detector 150 monitors the data that flows through the input data bus 130, detects data destination plane information and bandwidth (not shown) described in the data header of this data and outputs these to the reconfigurable-processor management unit 140.

It should be noted that the structure of the reconfigurable processor 100 is similar to that of the first embodiment shown in FIG. 2.

Furthermore, it is preferred that the output timing be synchronized to the operating frequency of the reconfigurable processor 100.

The second embodiment will be described with regard to circuit reconfiguration processing executed by the reconfigurable-processor management unit 140. The structure of the reconfigurable-processor management unit 140 is similar to that of the first embodiment shown in FIG. 4.

Figure 7:
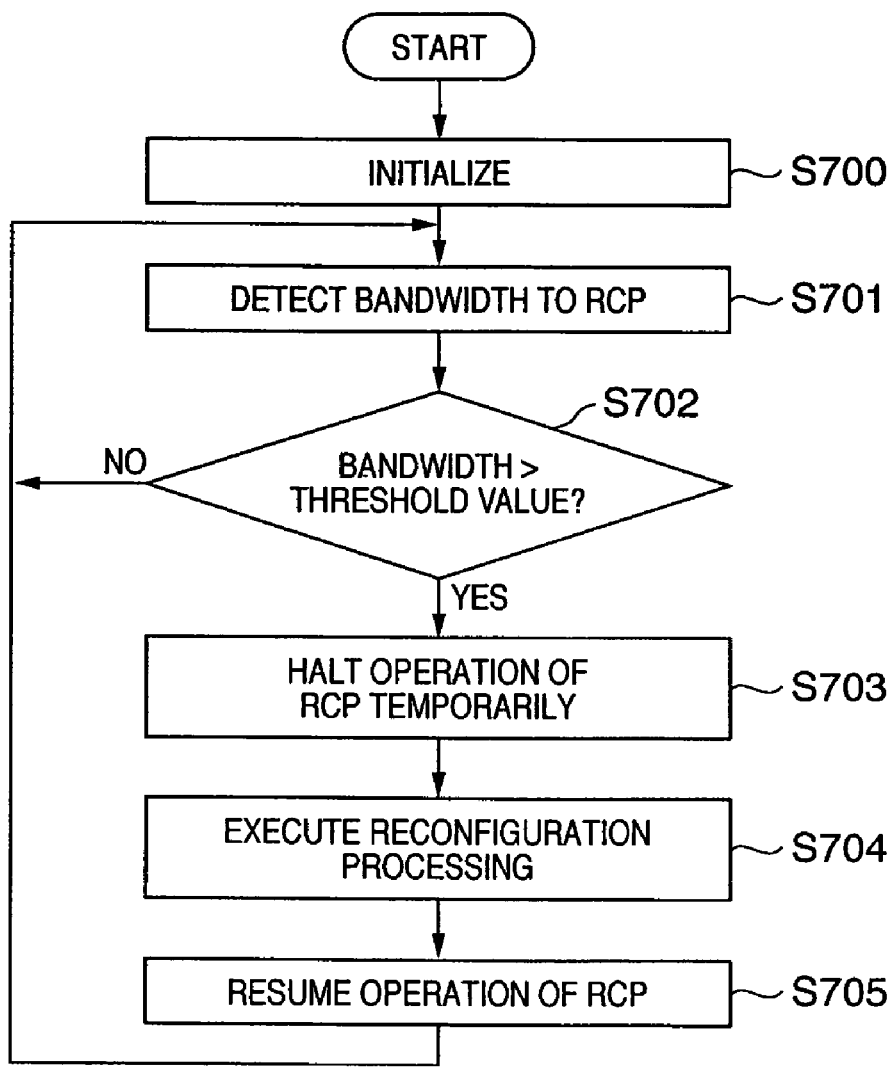
FIG. 7 is a flowchart illustrating circuit reconfiguration processing according to a second embodiment of the present invention.

FIG. 7 is a flowchart illustrating circuit reconfiguration processing according to the second embodiment. As shown in FIG. 7, the second embodiment is such that the temperature detection step S501 and detected-temperature comparison step S502 shown in FIG. 5 of the first embodiment are replaced by detection of bandwidth and comparison of detected bandwidth.

At step S701 in FIG. 701, the bandwidth detector 150 detects the data destination plane information and bandwidth and outputs these to the reconfigurable-processor management unit 140. Next, at step S702, the reconfigurable-processor management unit 140 compares the bandwidth of every circuit configuration plane with a reference threshold bandwidth (not shown) of each circuit configuration plane, which is for execution of circuit reconfiguration, stored beforehand in the internal memory 142. If the bandwidth of a certain circuit configuration plane exceeds the threshold bandwidth of this circuit configuration plane, then control proceeds to step S703 and circuit reconfiguration processing is executed in a manner similar to the processing of steps from S503 onward in FIG. 5 of the first embodiment.

The first and second embodiments described above illustrate examples of an ideal data processing apparatus according to the present invention. However, the invention is not limited to these examples.

By way of example, the number of circuit configuration planes of the reconfigurable processor 100 is assumed to be four in the described rendered above. However, the number of circuit configuration planes may be increased or decreased as necessary.

Further, a PLL circuit for generating the operating clock of the circuitry is externally provided. However, this does not impose a limitation and the PLL circuit may be provided within the data processing apparatus proper.

In addition, each of the components that construct the data processing apparatus and the operation thereof in the embodiments can be changed within the scope of the claims.

In accordance with the first embodiment, circuit configuration can be changed optimally in accordance with the temperatures of the configuration planes of the logic circuit of the reconfigurable processor, and a local rise in temperature can be averaged over the entire package to prevent a rise in temperature.

In accordance with the second embodiment, circuit configuration can be changed optimally in accordance with the data processing states of the configuration planes of the logic circuit of the reconfigurable processor, and a local rise in temperature can be averaged over the entire package to prevent a rise in temperature.

As a result, circuit operation can be continued without lowering the operating frequency of the reconfigurable processor as compared with the prior art.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the recording medium, and then executing the program codes.

In this case, the program codes read from the recording medium implement the novel functions of the embodiments and the recording medium storing the program codes constitutes the invention.

Examples of recording media that can be used for supplying the program code are a floppy (registered trademark) disk, hard disk, optical disk, magneto-optical disk, CD-ROM, CD-R, magnetic tape, non-volatile type memory card or ROM, etc.

Further, besides the case where the aforesaid functions according to the embodiments are implemented by executing the program codes read by a computer, it goes without saying that the present invention covers a case where an operating system or the like running on the computer performs a part of or the entire actual process in accordance with the designation of program codes and implements the functions according to the embodiments.

Furthermore, the present invention also covers a case where, after the program codes read from the storage medium are written in a memory provided on a function expansion board inserted into the computer or in a function expansion unit connected to the computer, a CPU or the like contained in the function expansion board or function expansion unit performs a part of or the entire actual process in accordance with the designation of program codes and implements the functions of the above embodiments.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-063154, filed on Mar. 7, 2005 which is hereby incorporated by reference herein in its entirety.

What is claimed is:

1. A data processing apparatus capable of reconfiguring a processing circuit, comprising:
   a plurality of circuit configuration planes each capable of implementing a different function;
   detecting means for detecting information relating to a heat-release value of the plurality of circuit configuration planes; and
   reconfiguring means for reconfiguring at least one of the plurality of configuration planes in accordance with a comparison of the information relating to the heat-release value and a threshold value by interchanging functions between the plurality of circuit configuration planes.

2. The apparatus according to claim 1, wherein the processing circuit has the plurality circuit configuration planes each has a temporary memory for holding input data to be processed, said apparatus further comprising storage means for storing correspondence between function information and the temporary memory with regard to respective ones of the plurality of circuit configuration planes.

3. The apparatus according to claim 1, wherein the processing circuit has the plurality circuit configuration planes, and said detecting means has a temperature sensor for measuring the temperature of each of the plurality of circuit configuration planes and detects each temperature from said temperature sensor as the information relating to the heat-release value.

4. The apparatus according to claim 1, wherein the processing circuit has the plurality circuit configuration planes, and said detecting means has a data-amount detector for detecting amount of input data applied to each of the plurality of circuit configuration planes and detects each data amount as the information relating to the heat-release value.

5. The apparatus according to claim 1, wherein the processing circuit has the plurality of circuit configuration planes, and if information relating to the heat-release value of at least one of the plurality of circuit configuration planes exceeds the prescribed threshold value, then said reconfiguring means changes the function of this circuit configuration plane to another function.

6. A data processing apparatus capable of reconfiguring a processing circuit, comprising:
   a plurality of circuit configuration planes each capable of implementing a different function;
   detecting means for detecting information relating to an amount of input data applied to each of the plurality of circuit configuration planes; and
   reconfiguring means for reconfiguring at least one of the plurality of configuration planes in accordance with a comparison of the amount of input data and a predetermined amount of input data by interchanging functions between the plurality of circuit configuration planes.

7. The apparatus according to claim 6, wherein the processing circuit has the plurality circuit configuration planes and said detecting means has a data-amount detector for detecting the amount of input data applied to each of the plurality of circuit configuration planes and detects each data bandwidth as the information relating to the amount of data.

8. A method of reconfiguring a reconfigurable processing circuit having a plurality of circuit configuration planes, comprising:
   detecting information relating to a heat-release value of the plurality of circuit configuration planes; and
   reconfiguring at least one of the plurality of configuration planes in accordance with a comparison of the information relating to the heat-release value and a threshold value by interchanging functions between the plurality of circuit configuration planes.

9. The method according to claim 8, wherein temperature of each of the plurality of circuit configuration planes of the processing circuit is detected at said detecting step as the information relating to the heat-release value.

10. The method according to claim 8, wherein the amount of input data applied to each of the plurality of circuit configuration planes of the processing circuit is detected at said detecting step as the information relating to the heat-release value.

11. A method of reconfiguring a reconfigurable processing circuit having a plurality of circuit configuration planes, comprising:

detecting information relating to an amount of input data applied to the plurality of circuit configuration planes; and reconfiguring at least one of the plurality of configuration planes in accordance with a comparison of the amount of input data and a predetermined amount of input data by interchanging functions between the plurality of circuit configuration planes.

12. The method according to claim 11, wherein the amount of input data applied to each of the plurality of circuit configuration planes of the processing circuit is detected at said detecting step as the information relating to the amount of data.

* * * * *